J. KOCH & J. F. ZIMMERMAN.
TIRE MAKING MACHINE.
APPLICATION FILED JAN. 2, 1914.
1,158,506.
Patented Nov. 2, 1915.
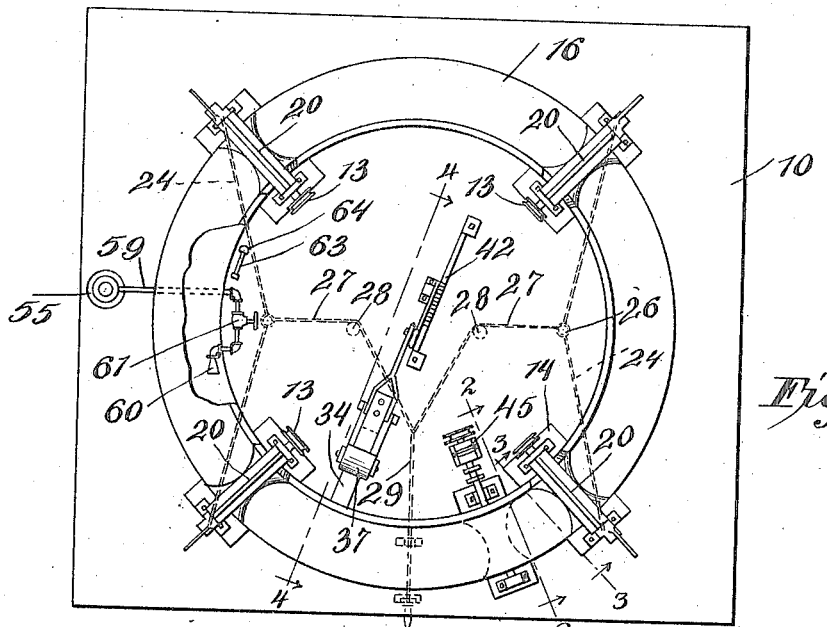
Fig. 1.
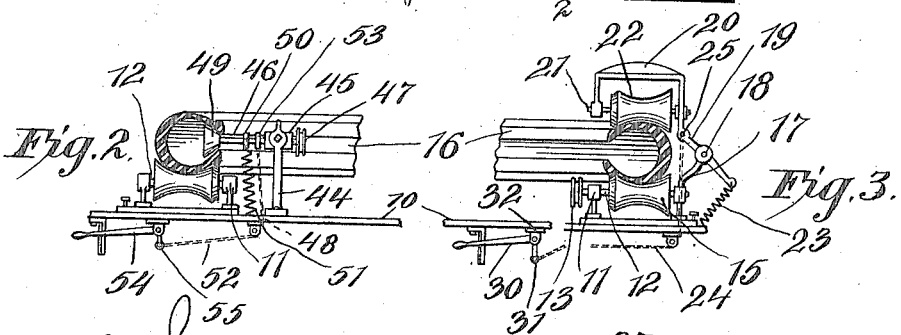
Fig. 2.   Fig. 3.
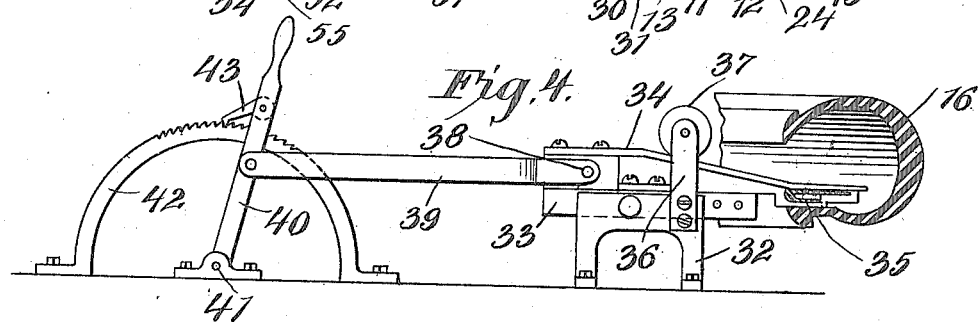
Fig. 4.
Fig. 5.
Witnesses:
Wynne Johnson
Inventors
J. F. Zimmerman
John Koch
C. L. Parker, Attorney

UNITED STATES PATENT OFFICE.

JOHN KOCH AND JOHN F. ZIMMERMAN, OF AKRON, OHIO.

TIRE-MAKING MACHINE.

1,158,506.

Specification of Letters Patent. Patented Nov. 2, 1915.

Application filed January 2, 1914. Serial No. 809,930.

*To all whom it may concern:*

Be it known that we, JOHN KOCH, a subject of the Emperor of Austria-Hungary, and JOHN F. ZIMMERMAN, a citizen of the United States, residing at Akron, in the county of Summit and State of Ohio, have invented certain new and useful Improvements in Tire-Making Machines, of which the following is a specification.

Our invention relates to a machine for applying cement or the like to the interior of tires or tire-casings and the flaps or layers thereof, and for holding or laying the same.

An important object of the invention is to provide a machine of the above mentioned character, which is convenient in use, and will expedite the manufacture of tires or tire-casings.

Other objects and advantages of the invention will be apparent during the course of the following description.

In the accompanying drawings, forming a part of this specification, and in which like numerals are employed to designate like parts throughout the same, Figure 1 is a plan view of a machine embodying our invention, without the tire in place thereon, Fig. 2 is a transverse sectional view taken on line 2—2 of Fig. 1, with the tire in place, Fig. 3 is a similar view taken on line 3—3 of Fig. 1, Fig. 4 is a similar view taken on line 4—4 of Fig. 1, and, Fig. 5 is a side elevation, partly in section, of the cement applying means.

In the drawings, wherein for the purpose of illustration, is shown a preferred embodiment of our invention, the numeral 10 designates a table top, carried by legs or the like (not shown).

Rigidly mounted upon this table top 10 are pairs of vertical brackets of bearings 11, preferably four in number, and equi-distantly spaced, as shown. Journaled in the brackets or bearings 11 are horizontal rotatable shafts 12, having their inner ends connected with grooved pulleys 13, or the like, driven from belts (not shown) extending from beneath the table top and passing through the opening 14, as shown. Any other suitable means may be employed to rotate the shafts 12, it being sufficient that all of the shafts are rotated at the same speed and in the same direction. Rigidly mounted upon the horizontal rotatable shafts 12 are grooved or concaved wheels or pulleys 15 which are radially disposed and adapted to receive a tire or tire-casing 16 thereon, to rotate the same.

Disposed outwardly of and adjacent the grooved wheels or pulleys 15 are vertical posts 17, rigidly mounted upon the table top 10, as shown. Pivotally connected to the upper ends of the posts 17, as shown at 18, are normally inclined vertically swinging levers 19, having normally horizontally arranged brackets 20, rigidly secured thereto and preferably formed integral therewith, as shown. The brackets 20 are approximately inverted U-shaped and have horizontal shafts or spindles 21 journaled therethrough, carrying upper radially disposed grooved wheels or pulleys 22, corresponding in number and arrangement to the pulleys or wheels 15, as shown. The function of the upper wheels or pulleys 22 is to aid in guiding the tire or tire-casing 16 during its travel and to force the same into proper frictional engagement with the lower wheels or pulleys 15. Connected with the outer lower ends of the levers 19 are retractile coil springs 23, the lower ends of which are attached to the table top 10, as shown. It is thus seen that when the levers 19 are released, the springs 23 will automatically swing the levers and the brackets 20 carried thereby to a substantially vertical position, thus enabling the tire or tire-casing 16 to be removed or inserted in place by an upward movement. Means are provided to swing the brackets 20 and wheels or pulleys 22, inwardly and downwardly in opposition to the springs 23, comprising flexible elements or cables 24, attached to the levers 19, as shown at 25. These cables, as more clearly shown in Fig. 1, are connected in pairs, as shown at 26, with cables 27, passed about pulleys 28 secured to the table top 10. The cables 27 are connected with an operating cable 29, having connection with one arm of a bell-crank lever 30, as shown at 31 (see Fig. 3). The lever 30 is pivoted to a fixed bracket, as shown at 32, any suitable means (not shown) being employed to hold this lever in the upper or closed position. From the foregoing description, it is obvious that by swinging the lever 30 upwardly, the cables 24 will be pulled which will swing the brackets 20 downwardly, moving the grooved wheels or pulleys 22 into proper clamping or frictional engagement with the tire or tire-casing.

Means are provided to pass or fold the flaps or layers of the tire shoe into the same, comprising a bracket or table 32, which may be rigidly attached to the table top 10, preferably in the position shown. Mounted to slide or reciprocate radially upon this table 32, is a carriage 33 to which is rigidly attached a laterally resilient inclined tool 34, carrying at its outer end a head 35, to receive the flaps or folds, and upon being moved radially outwardly pass the same into the tire or tire-casing 16, as is obvious. Attached to the opposite sides of the table 32 are vertical arms 36, to the upper ends of which are connected a depressing roller 37, disposed above and in engagement with the tool 34, as shown. It is obvious that upon the upward movement of the tool arm 34, the same by engaging the roller 37 will be depressed, whereby the head 35 will be capable of moving the flaps or strips into engagement with the interior of the tire or tire-shoe. Pivotally connected with the carriage 33, as shown at 38, is a link or pitman 39, pivoted to a vertically swinging lever 40, which is pivoted to the table top 10, as shown at 41. Arranged adjacent the lever 40 is a toothed quadrant 42, adapted to be engaged by a pawl 43, pivoted to the lever 40, as shown. It is thus seen that means are provided to lock the tool arm 34 in adjustment at the outer position.

Means are provided to roll and press the flaps or layers to the inner surface of the tire or tire-shoe, after they have been inserted therein, the same comprising a post or support 44, rigidly attached to the table top 10, preferably at the points shown. The upper end of the post 44 is preferably forked to receive a vertically swinging bearing 45, having pivotal connection therewith. Journaled within this bearing is a rotatable vertically swinging shaft 46, but this shaft cannot partake of perceptible longitudinal movement with respect to the bearing 45. Rigidly attached to the inner end of the bearing 45 is a grooved pulley 47, for receiving a belt (not shown) passing from beneath the table top through an opening 48, to drive the same. Any other suitable means may be employed to rotate the shaft 46. Rigidly connected with the outer end of the shaft 46 is a tapered or conical roll 49, adapted to enter the tire or tire-shoe, and engage with the lower portion thereof, supported by the lower wheels or pulleys 15. Connected with the shaft 46, by means of a ring 50 having swiveled engagement therewith, is a compressible coil spring 51, serving to automatically shift the shaft 46 upwardly when released. The shaft 46 is moved downwardly, whereby the roll 49 is brought to the proper frictional engagement with the tire or tire-shoe, by a cable or flexible element 52, connected with the shaft 46 by a ring 53, having swiveled engagement therewith. The cable 52 is connected with one end of a swinging bell-crank lever 54, pivoted to a fixed bracket, as shown at 55. By swinging the lever 54 upwardly, it is obvious that the tapered roll 49 may be moved downwardly into proper frictional engagement with the tire or tire-shoe. Any suitable means may be employed to lock the lever 54 in the upper or closed position, if desired.

Means are provided to supply a liquid cement or the like to the inner portion of the tire or tire-casing or the inwardly folded flap or layer thereof, comprising a preferably vertically arranged cylinder or shell 55, rigidly mounted upon the table top 10, preferably in the position shown. The liquid cement or the like within this cylinder 55 is maintained at a suitable pressure to feed the same, by a plunger 56, having connection with a rod 57, extending exteriorly of and above the cylinder 55. The rod 57 carries a head 58, by means of which the plunger 56 may be conveniently depressed. Connected with the lower outlet end of the cylinder 55 is a pipe 59, preferably extending below and under the tire or tire-casing and has connection with a suitable spray-nozzle 60, adapted to be passed within the tire or tire-shoe, to supply the liquid cement to the desired parts. Connected in the pipe 59 is a suitable cut-off valve 61 to control the charge of the cement.

Means are provided to blow air upon the parts of the tire or tire-casing previously treated with the liquid cement, to expedite the hardening of the cement, comprising a perforated pipe 63, arranged inwardly of and in proximity to the tire or tire-casing, as shown. This pipe 63 has connection with a pipe 64, preferably extending through the table top 10, for connection with a suitable source of compressed-air (not shown).

The operation of the apparatus is as follows: To place the tire or tire-casing upon the grooved wheels or pulleys 15, the lever 30 is swung downwardly, whereby the springs 23 will swing the brackets 20 upwardly, carrying the wheels or pulleys 22 upwardly, providing space whereby the tire may be arranged upon the wheels or pulleys 15. This having been done, the lever 30 is swung upwardly, whereby the upper wheels or pulleys 22 are brought into proper pivotal engagement with the tire or tire-casing. The tire or tire-casing will now be rotated in one direction, preferably clock-wise. During this rotation, the flaps or layers carried by the tire or tire-casing, adjacent the beads, may be quickly and conveniently folded or moved to the interior of the same, by the operator swinging the lever 40 outwardly, which causes the head 35 of the tool arm 34 to engage with these flaps or layers and fold the same inwardly upon the tire or tire-casing. The roller 49 may now be brought into action by swinging the lever 54 upwardly, which causes the roller 49 to be swung downwardly, whereby the folding of these flaps or layers is completed. By proper manipulation of the valve 62, the liquid cement may be applied to the folded flaps or layers, subsequently to which they are again subjected to the action of the roller 49. To aid in expediting the hardening of the cement, the same may be subjected to a current of air discharging from the perforated pipe 63.

It is to be understood that the form of our invention herewith shown and described is to be taken as a preferred example of the same and that various changes in the shape, size, and arrangement of parts may be resorted to without departing from the spirit of the invention or the scope of the subjoined claims.

Having thus described our invention, we claim:—

1. In a tire making machine of the character described, a lower set of wheels to engage and support a tire being made, an upper set of wheels to engage with the top of the tire, means to move the upper set of wheels downwardly, a supporting element arranged near the sets of wheels, and a rolling member carried by the supporting element and adapted for operation within the tire.

2. In a tire making machine of the character described, a lower set of wheels to engage and support a tire being made, means to rotate certain of the wheels, an upper set of wheels to engage with the top of the tire, means to move the upper set of wheels downwardly, a movable supporting element arranged near the sets of wheels, a rolling member carried by the supporting element and adapted for operation within the tire, and means to rotate the rolling element.

3. In a tire making machine of the character described, a lower set of grooved wheels to engage and support a tire being made, means to rotate certain of the wheels, an upper set of grooved wheels to engage with the top of the tire, vertically swinging supports carrying the upper set of wheels, a vertically swinging bearing arranged near the sets of wheels, a rotatable shaft journaled through the bearing, means to drive the shaft, and a tapered rolling member carried by the shaft and adapted to enter the casing.

4. In a tire making machine, a support, a lower set of grooved wheels mounted thereon to receive and rotate the tire, means to drive the wheels, pivoted brackets arranged near the grooved wheels, an upper set of wheels carried by the brackets to engage the top of the tire, automatic means to swing the brackets upwardly, and manually operated means to swing the brackets downwardly.

5. In a tire making machine, a plurality of rotatable wheels to engage a tire and rotate the same, a stationary post, a vertically swinging bearing connected therewith, a rotatable shaft journaled in the bearing, a rolling-head carried by the shaft to enter the tire and engage with the flaps thereof, and means to move the rolling head downwardly into engagement with the lower portion of the tire supported by the wheels.

6. In a tire making machine, a plurality of wheels for supporting and rotating a tire, a flap engaging tool arranged inwardly of the wheels, and movable into and out of the tire, and means to move the tool.

7. In a tire making machine, a plurality of wheels for supporting and rotating a tire, a carriage arranged inwardly of the wheels, a table to guide the carriage in its movement, a resilient tool arm connected with the carriage, a depressing roller connected with the table and arranged above the tool arm to engage therewith, and means to reciprocate the carriage.

8. In a tire making machine, a plurality of wheels for supporting and rotating a tire, means for supplying a liquid cement to the flaps of the tire, during the rotation thereof, means for folding the flaps during the rotation of the tire, and a member adapted to be inserted within the tire, to engage and roll the flaps during the rotation of the tire.

9. In a tire making machine, a plurality of wheels for engaging and rotating a tire, means for supplying a liquid cement to the tire and flaps thereof, a movable element to engage and fold the flaps of the tire during the rotation thereof, a member adapted to be arranged within the tire to engage and roll the flaps, and means to supply a current of air to the flaps treated with the cement to expedite the hardening of such cement.

In testimony whereof we have signed our names to this specification of our invention in the presence of two subscribing witnesses.

JOHN KOCH.
JOHN F. ZIMMERMAN.

Witnesses:
T. W. KIMBER,
HARVEY MUSSER.

Copies of this patent may be obtained for five cents each, by addressing the "Commissioner of Patents, Washington, D. C."